United States Patent
Typpo

[19]
[11] Patent Number: 6,133,578
[45] Date of Patent: Oct. 17, 2000

[54] NUCLEAR GAUGE FOR MEASURING A CHARACTERISTIC OF MOVING SHEET MATERIAL AND ALIGNMENT COMPENSATION

[75] Inventor: Pekka M. Typpo, Cupertino, Calif.

[73] Assignee: Impact Systems, Inc., Los Gatos, Calif.

[21] Appl. No.: 09/111,046

[22] Filed: Jul. 7, 1998

[51] Int. Cl.$^7$ .................................. G21F 5/00; G21F 5/02
[52] U.S. Cl. ...................................... 250/497.1; 250/498.1; 250/506.1; 250/496.1
[58] Field of Search ............................ 250/515.1, 519.1, 250/506.1, 496.1, 497.1, 339.02, 393, 394, 507.1, 492.3, 308, 384, 498.1; 378/160

[56] References Cited

U.S. PATENT DOCUMENTS

| | | |
|---|---|---|
| 3,697,755 | 10/1972 | Boissevain et al. . |
| 4,743,755 | 5/1988 | Williams . |
| 5,010,766 | 4/1991 | Typpo ........................................ 73/159 |
| 5,233,195 | 8/1993 | Hellstrom .............................. 250/360.1 |
| 5,315,124 | 5/1994 | Goss et al. ............................ 250/497.1 |
| 5,432,353 | 7/1995 | Goss ...................................... 250/497.1 |
| 5,714,763 | 2/1998 | Chase et al. . |
| 5,928,475 | 7/1999 | Chase et al. ............................. 162/198 |

FOREIGN PATENT DOCUMENTS

0 195 168  9/1986  European Pat. Off. .

*Primary Examiner*—Seungsook Ham
*Assistant Examiner*—John Patti
*Attorney, Agent, or Firm*—Jerry G. Wright; Flehr Hohbach Test Albritton & Herbert LLP

[57] ABSTRACT

For measuring basis weight of a moving web in the cross direction scanner of a paper-making machine, an encapsulated nuclear source of Promethium 147 is used because of its wide area of emission. To conserve space it is mounted on a vertical axis. The source in a horizontal plane parallel to the moving web from a stowed position where the source is shielded to an active position where the source emits through an aperture, through the moving web, and to a detector. The x-y array planar type detector uses four detector segments symmetrically arranged around a center and compensates for belt direction misalignment (the belt driving the cross direction scanners) by mathematically manipulating the electrical signals from each detector to eliminate the error term.

10 Claims, 6 Drawing Sheets

NUCLEAR GAUGE FOR MEASURING A CHARACTERISTIC OF MOVING SHEET MATERIAL AND ALIGNMENT COMPENSATION

The present invention is directed to a nuclear gauge for measuring a characteristic of moving sheet material and alignment compensation and more specifically to where the moving sheet material is paper being produced by a paper making machine.

BACKGROUND OF THE INVENTION

In measuring the basis weight of moving sheet material a radiation source is mounted on one side of the sheet material and on the other side is a receiving transducer. The pairs of transducers are then scanned in a cross direction (perpendicular to the movement or machine direction of the sheet material) to provide a cross direction measurement of that particular characteristic.

When a nuclear gauge is used, such as with radioactive krypton gas, such nuclear source must be appropriately shielded when not in use. U.S. Pat. No. 5,432,353 illustrates one technique of shielding where the encapsulated nuclear source is mounted for rotation about a horizontal axis (parallel to the moving web) and when not in use merely rotated to face a side wall of its enclosure. See also U.S. Pat. No. 5,233,195. Since it is desirable to decrease the air gap between the radiation source and the moving web, this source should be as close to the sheet as possible. Thus, normally there is no room for a shutter to shield the source and this was the reason for the mounting in the above patents. Such shielding of the source by rotating it is space-saving. However, where a source other than krypton, such as promethium, is used, which has a much larger area of radiation and thus the encapsulated cylinder is larger, it would be too space consuming to mount such a source as illustrated in the above patents, and still provide proper shielding and also space for a standardization flag.

Also as discussed above, in regard to the alignment between the radiation source and the detector, increasing demands for accuracy of measurement requires some type of error compensation for mechanical imperfections in the transfer mechanisms causing the radiation source and detector to scan across the paper in a cross direction. One form of correction is illustrated in U.S. Pat. No. 5,010,766, in the name of the present inventor and assignee. In that technique a separate unit senses the misalignment and then makes appropriate compensation.

OBJECT AND SUMMARY OF INVENTION

It is therefore the general object of the present invention to provide an improved nuclear gauge for measuring a characteristic of moving sheet material and alignment compensation.

In accordance with the above object, there is provided apparatus for measuring a characteristic of a moving web of sheet material having a pair of transducers on opposite sides of the web the pair of transducers being scanned across the web. One of the pair of transducers has an aperture with a center axis perpendicular to the web and in close proximity to the web and includes an encapsulated radiation source which in a first position emits radiation along a radiation axis substantially coincident with the center axis through the aperture and through said web to the other of said pair of transducers. The other transducer includes detector means for sensing radiation received through the web from the radiation source. The encapsulated radiation source is mounted for movement in a plane perpendicular to said radiation axis and parallel to said web from an axis of movement, offset from the center axis, between a stowed position where the radiation from said nuclear source is shielded to the first position.

In addition from a detector standpoint there is provided a multi-segmented planar detector having three or more segments for use in measuring a characteristic of a moving web in conjunction with a radiation source on the opposite side of the web. The source has a radiation axis and a relatively large area of radiation emission. Each of the segments of the detector is symmetrically arranged around a center detector axis which is nominally coincident and aligned with the radiation axis whereby in this coincident condition electrical signals representative of received radiation having passed through the moving web to each detector segment are equal. Processing means eliminating any error due to misalignment between the axes by processing the signals (one from each said segment) to eliminate dependence on misalignment.

DETAILED DESCRIPTION OF THE PREFERRED EMBODIMENT

Figure 1:
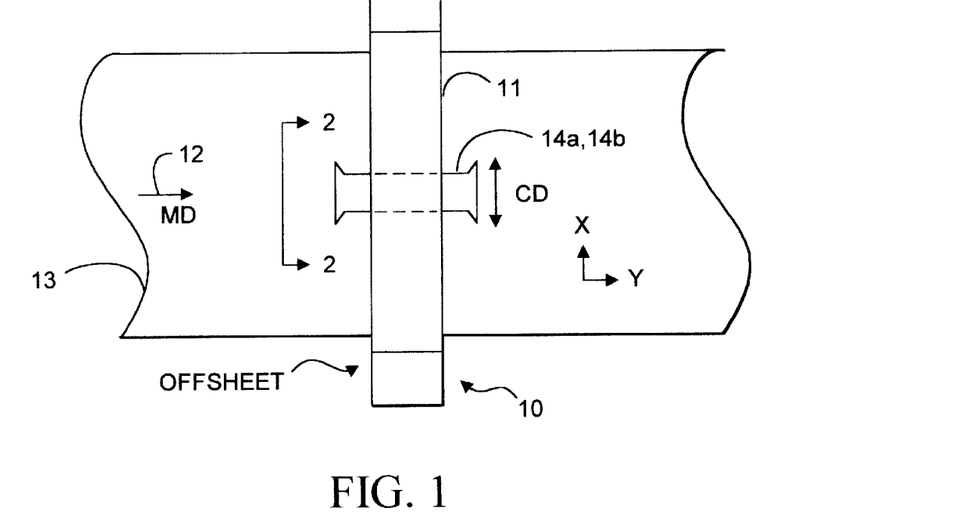
FIG. 1 is a plan view of a scanning system utilizing the present invention.
Figure 2:
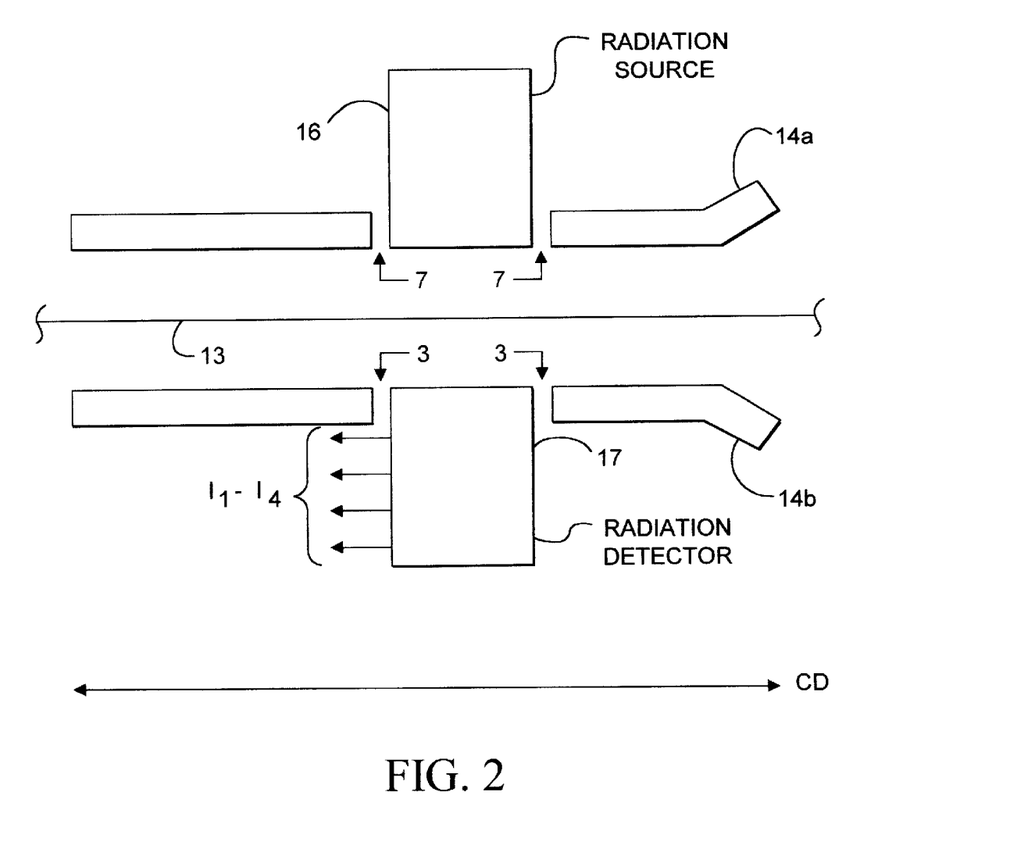
FIG. 2 is a simplified cross sectional view taken along the line 2—2 of FIG. 1.

FIG. 1 illustrates the scanner unit 10 which has a pair of cross beams 11 perpendicular to the machine direction (MD) (also designated y) 12 or the moving web 13. In this particular case this is a paper sheet being manufactured by a paper making machine. Mounted to travel across the sheet in a cross direction (CD), also designated x, is a pair of measuring heads or transducers 14a and 14b (see also FIG. 2). The top transducer 14a includes a radiation source 16 and the bottom transducer 14b a radiation detector 17. As is well-known in the art, the amount of radiation passing through the moving web 13 is indicative of a characteristic of the web such as basis weight.

Figure 3:
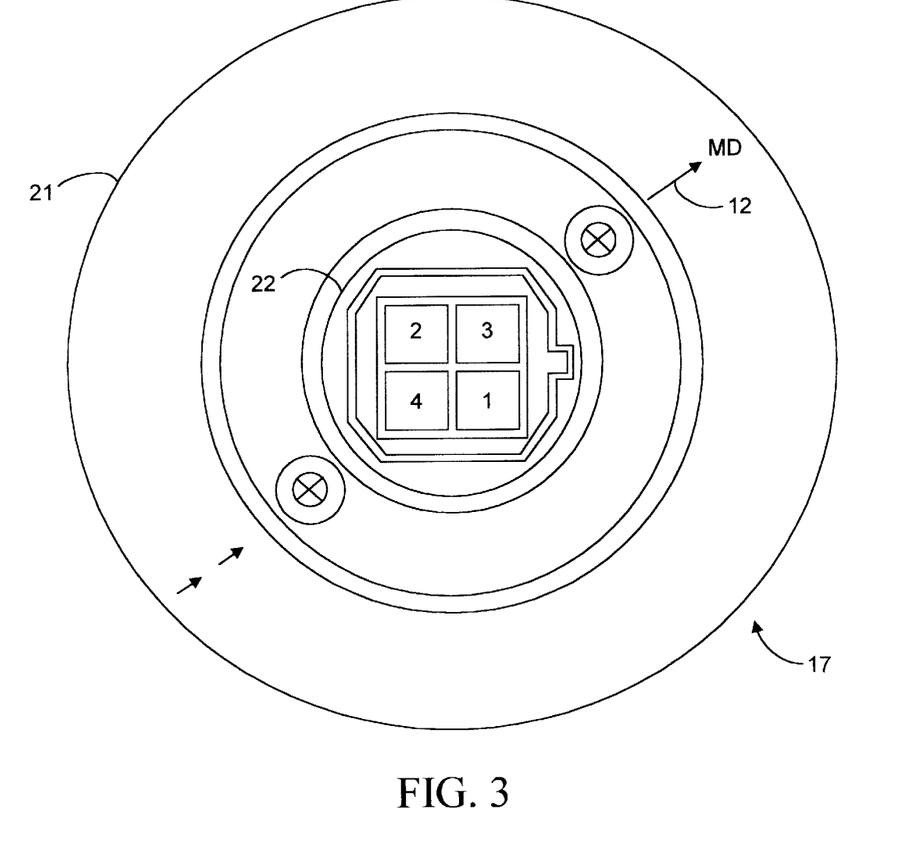
FIG. 3 is a plan view taken along the line of 3—3 of FIG. 2.
Figure 4:
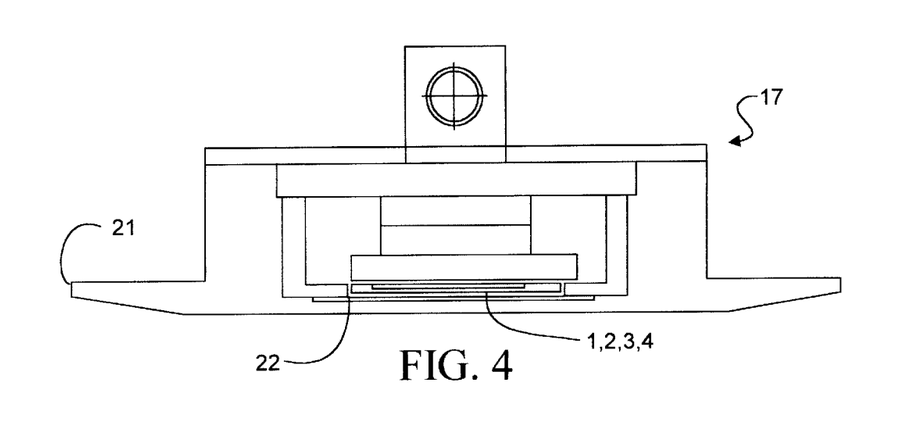
FIG. 4 is a side view of FIG. 3.
Figure 5:
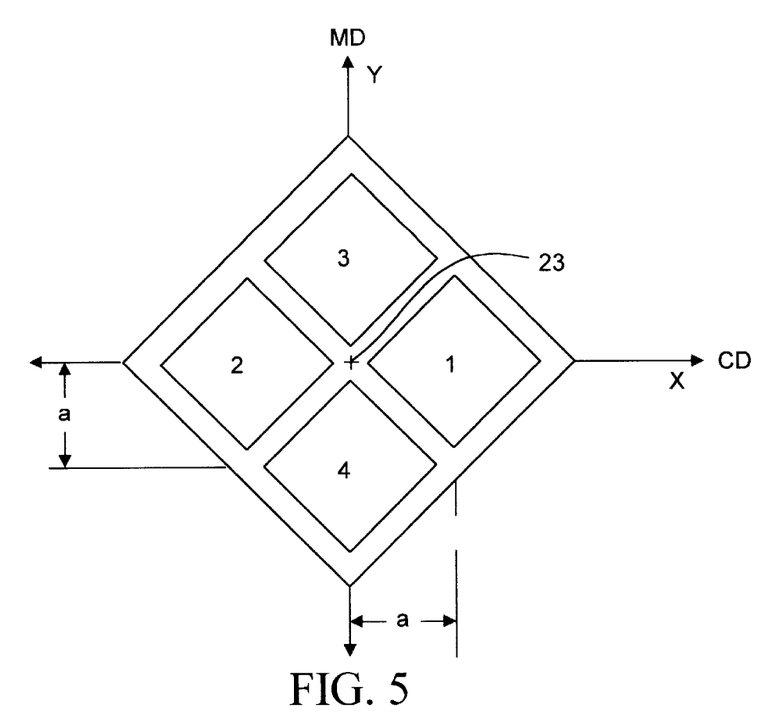
FIG. 5 is a detailed view of a portion of FIG. 3.

Referring to FIGS. 3 and 4 radiation detector 17 includes a circular plate 21 mounted to the transducer 14b with a open aperture 22 which has a 4 segment detector array 1, 2, 3, and 4 in a planar format. Such array is also shown in FIG. 5 and how it is aligned with the machine direction (MD) (or y direction) and cross direction (CD) (or x). Each of the segments of the array is a silicon photo voltaic cell with a uniform radiation response having good dynamic range. Each of the elements or segments 1, 2, 3 and 4 is symmetrically arranged around a center detector axis 23. This axis is nominally coincident with the axis of the radiation source (or the center axis of the aperture over which it is superimposed) assuming there is no misalignment. Each detector segment 1, 2, 3, and 4 is nominally square in configuration with the diagonals of elements 1 and 2 being co-linear and passing through the center detector axis 23. The center detector 23 is also nominally coincident with the radiation axis. This arrangement of detectors will provide compensation for the lateral misalignment that is commonly caused by the drive belt arrangement that moves the source and detector across the sheet in a cross direction.

As illustrated in FIG. 5 each square detector has, of course, a center indicated with the centers of detectors 3 and 4 being offset in the y direction a distance designated "a"; similarly the detectors 1 and 2 have their centers offset in the x direction a distance "a."

Figure 6:
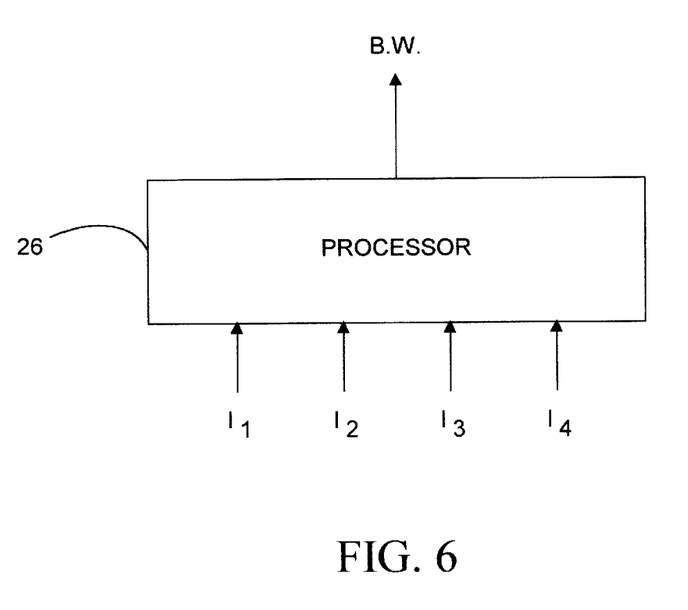
FIG. 6 is a block diagram of a processor used in the presented invention.

As illustrated in FIG. 6, radiation received by the each of the detectors is in the form of the four currents $I_1$, $I_2$, $I_3$ and $I_4$. These are input into a processor 26 to provide a measurement such as basis weight (B.W.) which has been compensated for any misalignment of the source and detector.

Figure 7:
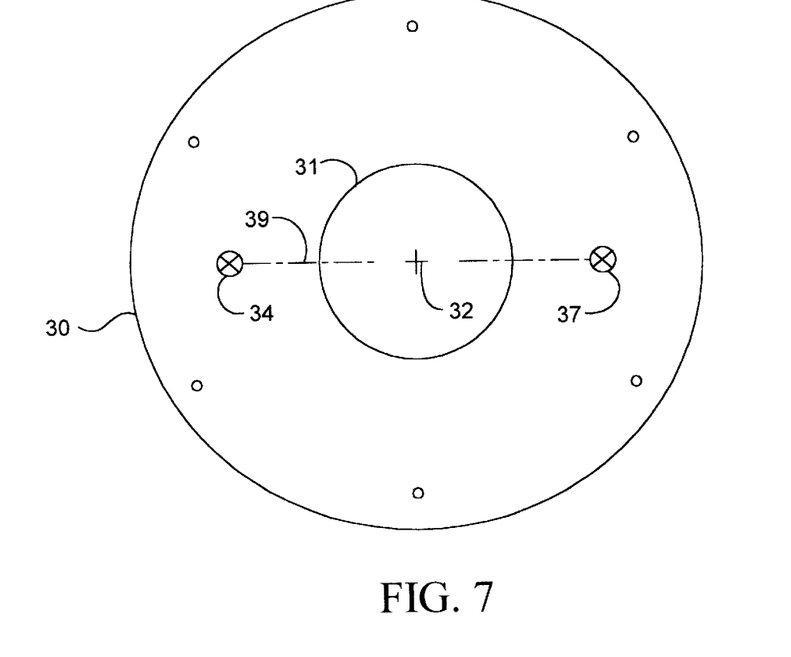
FIG. 7 is a plan view taken along the line 7—7 of FIG. 2.
Figure 8:
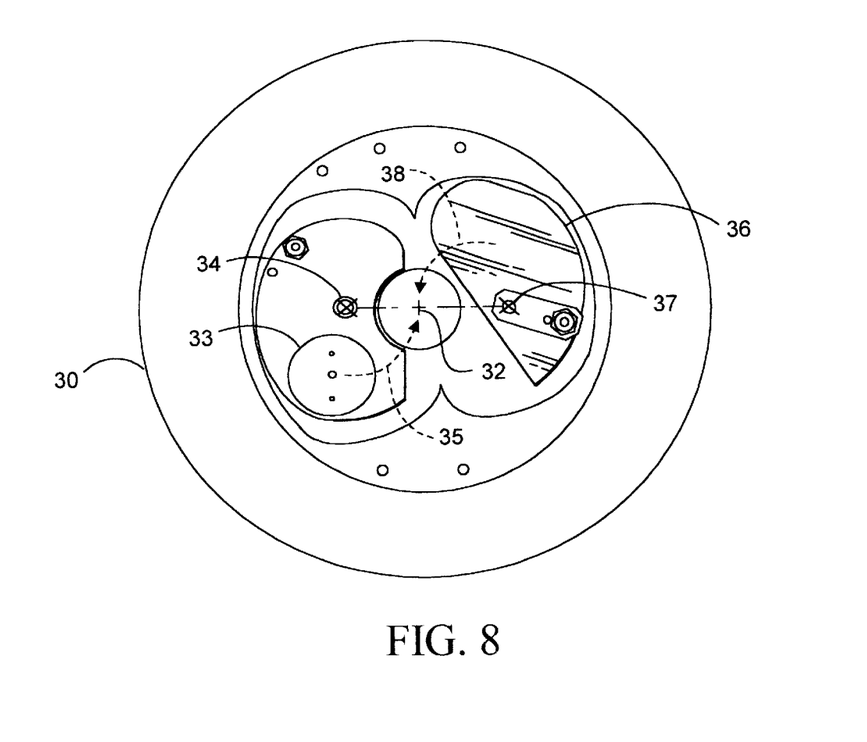
FIG. 8 is a plan view of the other side of FIG. 7.

Now referring specifically (FIGS. 7 and 8) to the top transducer head 14a a circular plate 30 which faces the moving web 13 includes an aperture 31 which has a center axis 32. FIG. 8 is the opposite side of plate 30 showing mounted on it an encapsulated radiation source 33 (Promethium 147) which is mounted for rotation on an axis 34 to move along the locus 35 from a stowed position where the radiation from the nuclear source is shielded by the plate 30 to a first position where the radiation source and its radiation axis is actually coincident with the center axis 32.

Similarly also illustrated in FIG. 8 is clear transparent radiation standardization flag 36, for example made of a thin sheet of clear plastic, which is mounted for rotation on an axis 37 along from a stowed position and along a locus of movement 38 so that flag may be rotated between the radiation source and the moving web for standardization purposes. Thus referring back to FIG. 7 both the offset axis 34 of rotation of the encapsulated radiation source and flag axis 37 are on the line 39 which is a diameter of aperture 31 and of course passes through the center axis 32 of the aperture.

Figure 9:
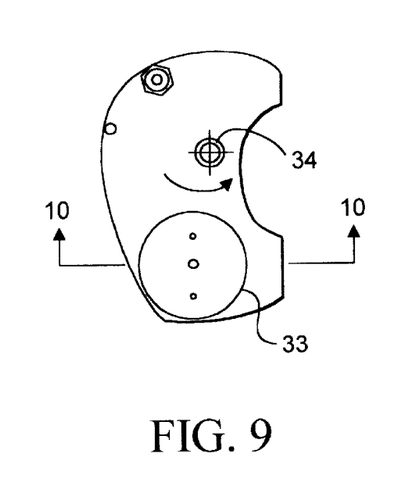
FIG. 9 is a view of a detail of FIG. 8.
Figure 10:
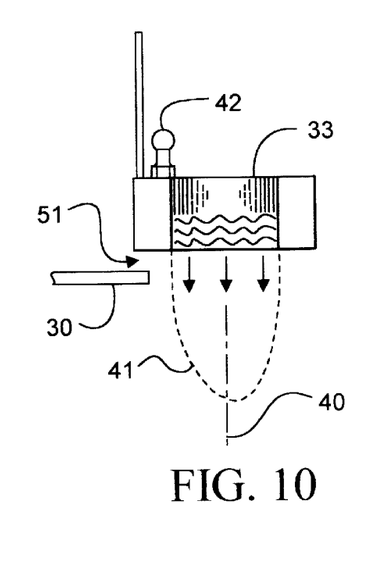
FIG. 10 is a cross sectional view taken along the line 10—10 of FIG. 9.
Figure 11:
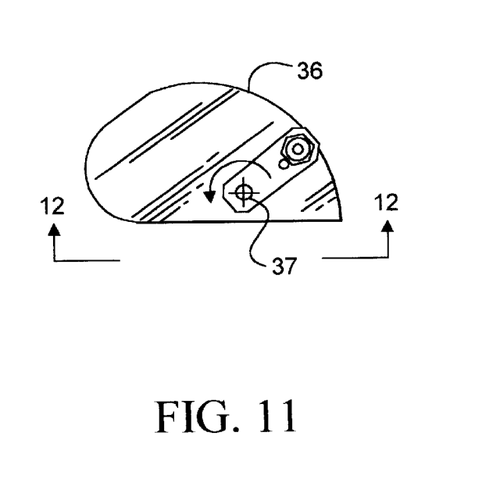
FIG. 11 is a detail of a portion of FIG. 8.
Figure 12:
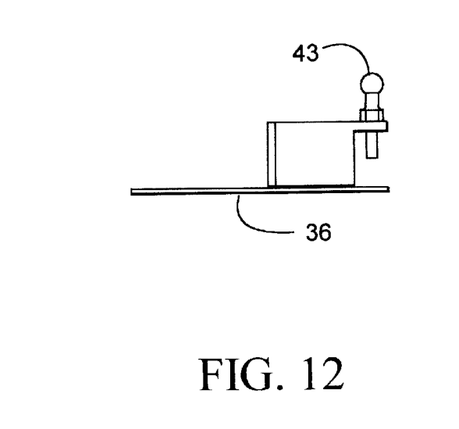
FIG. 12 is a side view taken along the line 12—12 of FIG. 11.
Figure 13:
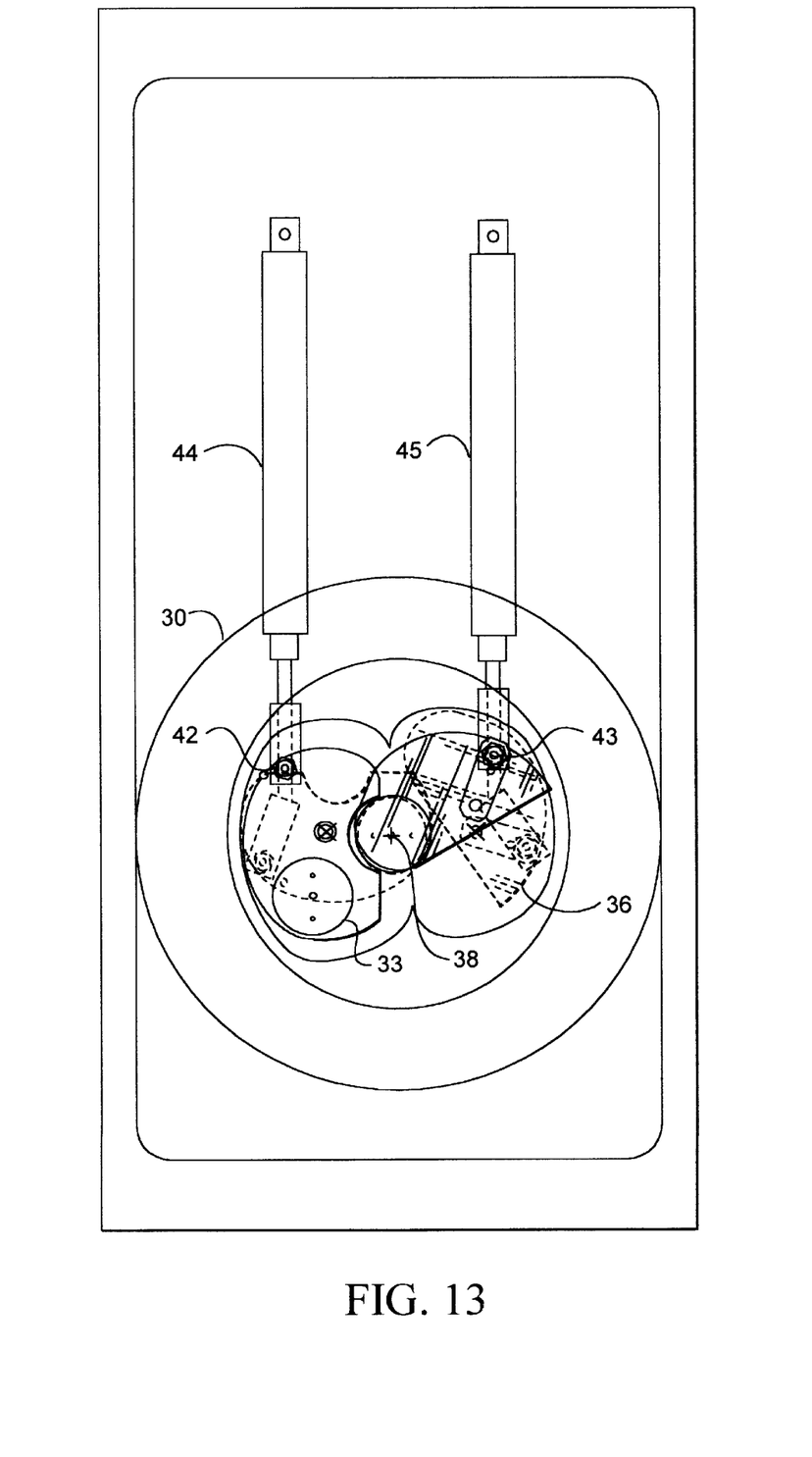
FIG. 13 incorporates FIG. 8 and shows the operation of the present invention.

FIGS. 9 and 11 illustrate the rotating parts and the mounting for encapsulated radiation source 33 which rotates in the direction shown by the arrow on the axis 34 and the standardization flag 36 rotates in the direction shown around the axis 37. FIGS. 10 and 12 are side views of the source and standardization flag, respectively. Referring to FIG. 10, the radiation source includes a substantially large area of radiation emission, for example 15.6 mm, which radiates in a substantially parabolic pattern 41 having a radiation axis 40. Mounted to provide movement to the radiation source and the standardization flag are ball-type connectors 42 and 43, respectively. And referring to FIG. 13 these connectors are again shown connected to pistons 44 and 45 to rotate the radiation source 33 and standardization flag 36 from a stowed positions to an active positions.

With the mounting of the radiation source 33 for movement in a plane parallel to that of the web or perpendicular to that of the radiation axis even though a fairly large area of radiation is present necessitating a relatively larger encapsulated radiation source 33, effective shielding (or shuttering) is provided for the radiation source in the stowed position illustrated in FIG. 8. Here the open-ended encapsulated radiation source faces the circular disk 30. At the same time, there is adequate spacing 51 (FIG. 10) between the circular disk 30 and the bottom of the transducer 33 to allow space for standardization flag 36 to slide there between.

Although the detector ideally is shown as having 4 segments (this is because the error correction process is believed to be relatively simple in this case) three segments in the form of 120° wedges could be used. All that is necessary is that a planar array of three or more segments be used which are symmetrically arranged around a center axis. Referring now to FIGS. 5 and 6 and the set of equations following below, as discussed above the four detectors arranged symmetrically around the center 23 provides compensation for lateral misalignment caused by the drive belt arrangement which moves the source and detector across the sheet. As illustrated and discussed above two of the detectors 1 and 2 have their centers on the x axis and detectors 3 and 4 have their centers on the y axis. These centers are all at the nominal distance "a" from the center detector axis 23. When the detector and the source are perfectly aligned individual detector signals $I_1$ through $I_4$ can be modeled by the equations (1) through (4) as a function of misalignment in the x-y plane.

Referring specifically to these equations, x and y are the misalignment coordinates, a is the distance of the individual detectors from the center detector axis 23, S is a signal from an any one individual detector when the center such detector is coincident with the radiation axis of the source, and k is a factor that depends on the size and distance of the source, and to some degree on the basis weight to be measured. Thus, for example, referring to equation (1) if the radiation axis is centered on the center of the detector 1, then x=a and y=0 and $I_1$ is equal to S. However, when it moves to the center axis 23, as shown illustrated in FIG. 10, the radiation source has an emission in the shape of a parabola and therefore the equations (1) through (4) are in the form of a parabolic function.

Equation (5) is the sum of equations (1) through (4) and the sum is indicated as $I_T$. It is apparent that if x and y are equal to 0 (that is there is no misalignment) that equation (5) provides accurate measure of received radiation which is the term $4S(1-ka^2)$. In other words, the actual radiation received and the constants k and a. However, where there is an alignment, x and y must be taken into account. Since there is no direct way of measuring x and y, the error must be eliminated by a mathematical manipulation of the various currents $I_1$ through $I_4$. From an inspection of FIG. 5 it can be seen that detectors 1 and 2 and their equations represent errors in the cross direction (the most significant misalignment) and that detectors 3 and 4 and their equations (3) and (4) errors in the machine direction. And it is also obvious that the error term is, as illustrated in equation (5), as an $x^2$ plus $y^2$ type of factor. Thus the mathematical entity is created of equation (6) which matches the error term $k(x^2+y^2)$. And in addition this error correcting entity must also eliminate the S term.

It has been found that this can be accomplished as indicated in equation (6) by taking the square of the cross directional signals that is $(I_1-I_2)^2$, the square of the difference of the machine direction signals $(I_3-I_4)^2$ and dividing it by the square of the $I_T$. Referring to the result of that computation, because of the division by $I_T^2$ no S is in the result.

Furthermore in the denominator of equation (6) all of the latter terms have less than 1% effect on the total value of the expression which may be therefore reduced to the expression of equation (7). Therefore, the error term in equation (5) containing the $x^2+y^2$ can be rewritten as shown in equation (8). What has been done is that the $k(x^2+y^2)$ term of equation (7) which is the other half of equation (6), has been solved and has been substituted in equation (8). Then the right side of the equation (8) is substituted in equation (5) to produce a misalignment corrected signal $I_T$. Noted that equation (9) is a re-arrangement of equation (5) where the term $4S(1-ka^2)$ is solved for and thus the correction term is all in the denominator. The constant term (viz. $ka^2$) of equation (9) as illustrated in the left-hand side of the equation (10) depends slightly on the amount of mass between the source and detector due to scattering of the radiation beam. Experiments have shown one possible way to model this term is as illustrated in the right side of equation (10) where p and q are constants and $I_{T0}$ is the value of I with no web in the measuring gap. When it is taken into account that denominator of equation (9) is almost one the final correction algorithm is equation (11). This corrected signal is processed by the processor 26 illustrated in FIG. 6. The calculation of basis weight is done in the same manner as uncompensated signals have been used previously. That is a corrected form of Beer's laws.

Thus to summarize the processing means for eliminating the misalignment error takes the sum of the signals from the four detectors and the square of difference of the pairs of machine direction and cross directional signals. And this directly eliminates the error term.

Thus an improved nuclear gauge for measuring a characteristic of moving sheet material and alignment compensation has been provided.

Equations $$I_1 = S\{1-k[(x-a)^2+y^2]\} \quad (1)$$

$$I_2 = S-\{1-k[(x+a)^2+y^2]\} \quad (2)$$

$$I_3 = S\{1-k[x^2+(y-a)^2]\} \quad (3)$$

$$I_4 = S\{1-k[x^2+(y+a)^2]\} \quad (4)$$

$$I_T = 4S(1-ka^2)[1-k(x^2+y^2)/(1-ka^2)] \quad (5)$$

$$[(I_1-I_2)^2+(I_3-I_4)^2]/I_T^2 = k(x^2+y^2)/\{(1-ka^2)[(1-ka^2)/ka^2-2(x^2+y^2)/a^2+(ka^2/(1-ka^2))((x^2+y^2)/a^2)^2]\} \quad (6)$$

$$= \frac{k(x^2+y^2)ka^2}{(1-ka^2)^2} \quad (7)$$

$$[1-k(x^2+y^2)/(1-ka^2)] = 1-[(1-ka^2)/ka^2][(I_1-I_2)^2+(I_3-I_4)^2]/I_T^2 \quad (8)$$

$$I'_T = I_T\{1-[(1-ka^2)/ka^2][(I_1-I_3)^2+(I_3-I_4)^2]/I_T^2\} = 4S(1-ka^2) \quad (9)$$

$$(1-ka^2)/ka^2 = p+q(I_T/I_{T0}) \quad (10)$$

$$I'_T = I_T\{1+[p+q(I_T/I_{T0})][(I_1-I_2)^2+(I_3-I_4)^2]/I_T^2\} \quad (11)$$

What is claimed is:

1. Apparatus for measuring a characteristic of a moving web of sheet material having a pair of transducers on opposite sides of the web the pair of transducers being scanned across the web the apparatus comprising:

one of said pair of transducers having an aperture with a center axis perpendicular to said web and in close proximity to said web and including an encapsulated radiation source which in a first position emits radiation along a radiation axis substantially coincident with said center axis through said aperture and through said web to the other of said pair of transducers, said other transducer including detector means for sensing radiation received through said web from said radiation source, means for mounting said encapsulated radiation source for movement in a plane perpendicular to said radiation axis and parallel to said web from an axis of movement, offset from said center axis, between a stowed position where said radiation from said radiation source is shielded to said first position.

2. Apparatus in claim 1 including a standardization flag mounted for movement on an axis offset from said center axis with said radiation source being axially spaced from said aperture to allow said flag to be rotated between said radiation source and said moving web.

3. Apparatus as in claim 2 where said flag axis and said radiation source axis are on a line through said center axis.

4. Apparatus as in claim 1 where said radiation detector is a two dimensional array with three or more segments symmetrically arranged around a center detector axis which is nominally coincident with said center axis of said aperture.

5. Apparatus as in claim 4 including means for receiving a plurality of electrical signals from said segment representing for each said segment radiation received after passing through said moving web, said signals being equal if said center detector axis is substantially coincident with the center axis of said aperture and said radiation axis but unequal and creating an error if there is a lack of such coincidence and including processing means for eliminating said error including taking the sum of said signals and the square of cross directional and machine directional pairs of said signals to eliminate error terms in those directions said machine direction being the direction of said moving web said cross direction being in the same plane and perpendicular to said machine direction.

6. In a multi-segmented planar detector having three or more segments for use in measuring a characteristic of a moving web in conjunction with a radiation source on the opposite side of the web having a radiation axis where the source has a relatively large area of radiation emission, each of said segments being symmetrically arranged around a center detector axis which is nominally coincident and aligned with said radiation axis whereby in this coincident condition electrical signals representative of received radiation having passed through said moving web to each detector segment are equal and taken together are indicative of a single measurement of said characteristic, but if said signals are unequal this is indicative of a misalignment between said axes, and including processing means for eliminating any error due to misalignment between said axes by processing said signals, one from each said segment, including mathematically processing said signals by use of summing and squaring, to eliminate dependence on misalignment.

7. A detector as in claim 6 including means for compensating for measurement error due to scattering of said radiation from said source including means for measuring said received radiation without said moving web between said radiation source and detector.

8. A detector as in claim 6 where there are four square segments the diagonals of each pair of the segments being co-linear and the diagonals of respective pairs perpendicular to each other, such diagonals passing through said center detector axis, one pair of diagonals having an orientation in the direction of the moving web and the other pair perpendicular or across such web.

9. A detector as in claim 6 where said radiation source is Promethium which radiates in a substantially parabolic pattern.

10. A detector as in claim 6 where said processing means includes means for taking the sum of said signals and the square of cross directional and machine directional pairs of said signals to eliminate error terms in those directions said machine direction being the direction of said moving web said cross direction being in the same plane and perpendicular to said machine direction.

* * * * *